US006457061B1

(12) United States Patent
Bal et al.

(10) Patent No.: US 6,457,061 B1
(45) Date of Patent: Sep. 24, 2002

(54) METHOD AND APPARATUS FOR PERFORMING INTERNET NETWORK ADDRESS TRANSLATION

(75) Inventors: Subhash Bal, Calabasas; Raghunath Iyer, Los Altos; Sundar Iyer, Palo Alto, all of CA (US)

(73) Assignee: PMC-Sierra, Santa Clara, CA (US)

( * ) Notice: Subject to any disclaimer, the term of this patent is extended or adjusted under 35 U.S.C. 154(b) by 0 days.

(21) Appl. No.: 09/199,839

(22) Filed: Nov. 24, 1998

(51) Int. Cl.[7] .............................................. G06F 15/16
(52) U.S. Cl. ....................................................... 709/245
(58) Field of Search ................................ 709/206, 245, 709/249, 228; 370/245, 292, 389, 341, 392, 401, 402

(56) References Cited

U.S. PATENT DOCUMENTS

| 5,636,216 | A | * | 6/1997 | Fox et al. ..................... 370/402 |
| 5,740,171 | A | * | 4/1998 | Mazzola et al. ............. 370/392 |
| 5,793,763 | A | * | 8/1998 | Mayes et al. ................ 370/389 |
| 5,940,376 | A | * | 8/1999 | Yanacek et al. ............. 370/250 |
| 6,006,272 | A | * | 12/1999 | Aravamundan et al. .... 370/245 |
| 6,055,236 | A | * | 4/2000 | Nessett et al. ............... 370/389 |
| 6,038,233 | A | * | 5/2000 | Hamamoto et al. ......... 370/401 |
| 6,058,431 | A | * | 5/2000 | Srisuresh et al. ........... 709/245 |
| 6,065,064 | A | * | 5/2000 | Satoh et al. .................. 709/249 |
| 6,128,664 | A | * | 10/2000 | Yanagidate et al. ......... 709/228 |
| 6,154,839 | A | * | 11/2000 | Arrow et al. ................ 713/154 |

* cited by examiner

*Primary Examiner*—Glenton B. Burgess
*Assistant Examiner*—Kimberly Flynn
(74) *Attorney, Agent, or Firm*—Dag Johansen; Stattler, Johansen & Adeli LLP

(57) ABSTRACT

A method and apparatus for performing network address translation is disclosed. The method generates statistically unique port number for each outgoing connection. The statistically unique port numbers are formed from a subset of bits from the source node's IP address and a subset of bits from the port number assigned by the source node. The statistically unique port number is used as an index into a table containing connection information. When a statistically unique port number fails to be absolutely unique, the method uses a secondary fallback system that generates a unique port number by using sequential numbering system. The information about the connections using unique port numbers that were generated sequentially is stored in a secondary connection table. The secondary connection table is organized as a Patricia tree.

27 Claims, 10 Drawing Sheets

METHOD AND APPARATUS FOR PERFORMING INTERNET NETWORK ADDRESS TRANSLATION

FIELD OF THE INVENTION

The present invention relates to the field of computer networking. In particular the present invention discloses a method and apparatus for generating port addresses that can be used for implementing a very fast look-up method to be performed for high-speed address translation.

BACKGROUND OF THE INVENTION

The Internet is a global interconnection of computer networks that share a set of well-defined data communication protocols. Specifically, most computer networks coupled to the global Internet communicate using the Transmission Control Protocol (TCP) and Internet Protocol (IP).

The Internet Protocol (under the current version 4) uses thirty-two bit numbers for addresses. The Internet Protocol addresses are usually written out in "dotted decimal" notation using a set of four numbers that are between zero (0) and two hundred fifty-five (255). The Internet Protocol addresses are allocated by an entity known as the Internet Assigned Numbers Authority (IANA) that maintains a web site at http://www.iana.org/.

Recently, a shortage of available Internet Protocol addresses has developed. The shortage has been caused by the exponential growth of the Internet in the last ten years and early inefficient IP address space allocation. There is now a scarcity of IP addresses such that new entities that wish to connect to the Internet either do not receive as many Internet addresses as they desire or are forced to pay a high price for additional IP address space.

In order to combat this problem, systems having network address translation were Created. Network address translation functions are typically built into routers or Internet firewalls. Network address translation is used to allow an entity with many internal computer nodes using "illegal" Internet protocol addresses to share one or more legally allocated Internet protocol addresses. Specifically, an internal network is created with a set of "internal" Internet protocol addresses that are not allowed to be used on the Internet.

A typical device with network address translation has two different network ports. The two-port network address translation device has first port coupled to the internal network with an "internal" network address. The second port of the two-port network address translation device is coupled to the global Internet with a legally allocated Internet protocol address. The two-port network address translation device handles all Internet communication from internal computer nodes coupled to the internal network.

The two-port network address translation device may perform a number of different functions such as packet filtering, protocol proxying, and split domain name service (DNS). However, one of the features that must be performed by the two-port network address translation device is a translation from internal network addresses into legal Internet addresses and vice versa. Specifically, when an internal network node attempts to communicate with a server on the Internet, the internal address is replaced with a legal Internet protocol address assigned to the two-port network address translation device. When the two-port network address translation device receives a response from the Internet server, the two-port network address translation device must translate the destination address of the response back into the internal address of the internal network node that initiated the communication. The translated packet is then passed on to the Internet network.

To perform Network Address Translation, the two-port network address translation device must maintain a list of all the active connections such that the two-port network address translation device knows which connections are assigned to which internal network bodes on the internal network. Most devices that perform network address translation use a simple list to store information about the current connections. Each time an internal network node uses an established connection or a response packet is received from the Internet server, the network address translation device must search the connection table to locate the internal network node that owns the connection. Searching the connection list takes time and thus introduces delays in the Internet communication. It would therefore be desirable to have a faster method of maintaining a list of connections.

SUMMARY OF THE INVENTION

The present invention discloses a method and apparatus for performing network address translation. The method of the present invention operates by generating statistically unique port numbers for outgoing connections that pass through a network address translation device. The statistically unique port numbers are formed from a subset of bits from the source node's IP address and a subset of bits from the port number assigned by the source node. Information about each connection is stored in a table of connections. When a server responds to a newly initiated connection, the server will respond to the assigned statistically unique port number on the network translation device. The network translation device uses the statistically unique port number in the response packet to find information about the connection. Specifically, the statistically unique port number is transformed into an index into the table of connection information.

When the statistically unique port number fails to be absolutely unique, the present invention uses a secondary fallback system that generates an absolutely unique port number using another means. In one embodiment, the secondary fallback system assigns sequential numbers. The information about connections that use unique port numbers generated by the secondary system are stored in a secondary connection table. In one embodiment, the secondary connection table is organized using a Patricia tree format.

Other objects, features, and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for performing Internet network address translation is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to a hardware implementation of an improved network address translation method. However, the same network address translation techniques can easily be implemented in software.

Network Address Translation

There are a number of uses for network address translation. For example, network address translation can be used to translate from a first network protocol to a second network protocol. However, the most popular reason to use network address translation is to allow a large number of local network nodes to access the Internet with a small number of legal Internet Protocol addresses.

Figure 1:
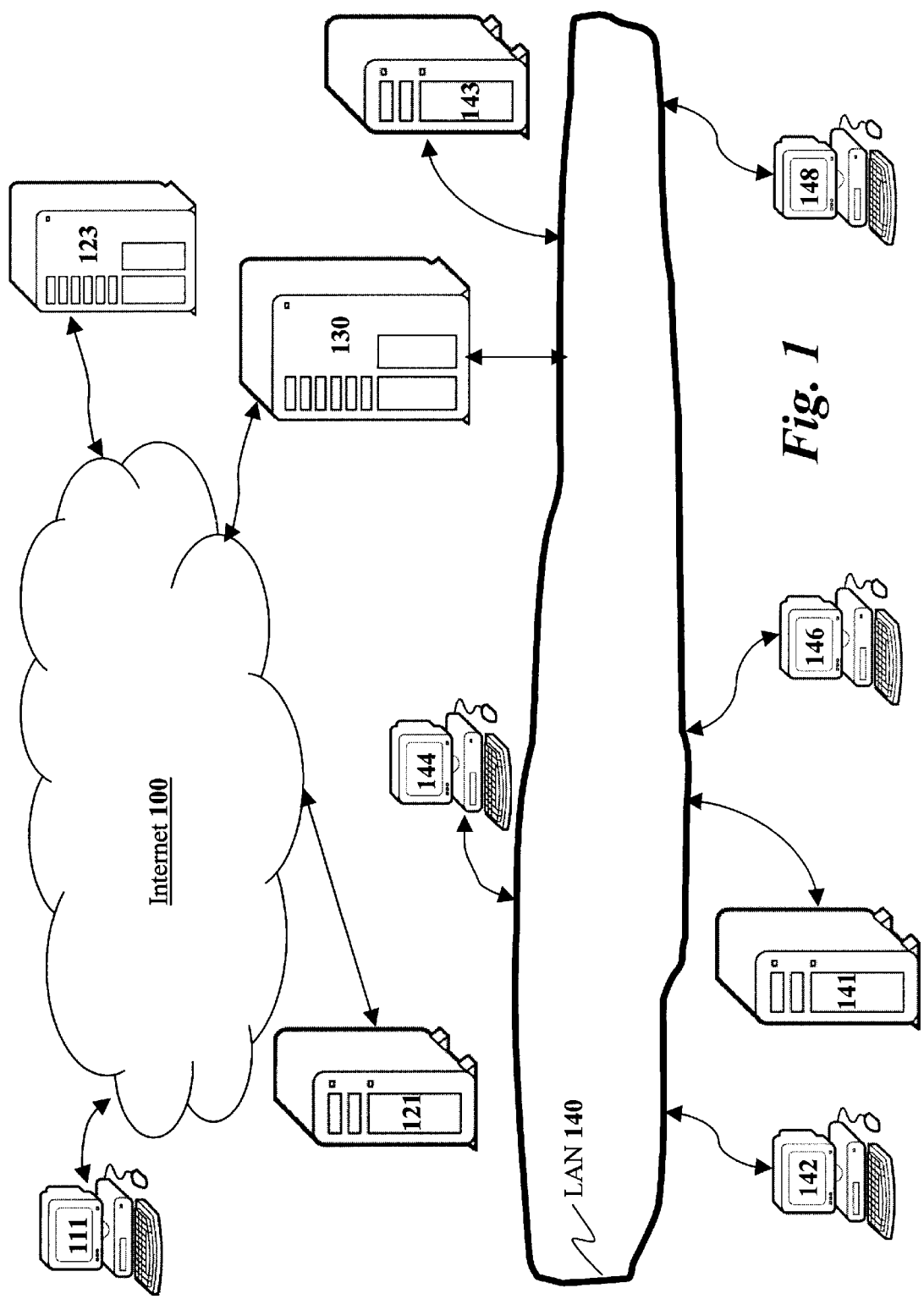
FIG. 1 illustrates a typical small local area network (LAN) coupled to the Internet through a network address translation device that shares a single legal external Internet Protocol address among a set of computer nodes coupled to the local area network.

For example, a business may have its local area network with a large number of network nodes coupled to the Internet through an Internet Service Provider (ISP) that only provides a small number of legal Internet addresses. When using the Internet Protocol, each network node must have a unique IP address. Since the number of network nodes on the internal network exceeds the number of legal Internet Protocol addresses provided, the business can not connect all its network nodes directly to the Internet. To allow all the network nodes on the local area network to access the Internet, a network address translation device needs to be situated between the Internet and the local area network. The network address translation device translates the internal network addresses used on the internal LAN into one of the legal Internet addresses provided by the Internet Service Provider. FIG. 1 illustrates an example of such a situation.

Referring to FIG. 1, a local area network (LAN) 140 is illustrated with a set of computer workstations 142, 144, 146, and 148 coupled thereto. The workstations 142, 144, 146, and 148 each have internal addresses that have been assigned by the network administrator. For example, all Internet Protocol (IP) addresses in the form of 10.X.Y.Z where X, Y, and Z are all between 0 and 255 are "Net 10" addresses that are defined to be IP addresses for internal use only.

The local area network (LAN) 140 also includes a couple of servers 141 and 143. If the servers 141 and 143 are only used for internal purposes then servers 141 and 143 would normally only have internal IP addresses. However, if the network administrator wishes to allow services on servers 141 and 143 to be accessed by clients out on the Internet 100, then servers 141 and 143 may be assigned legal Internet protocol addresses or internal addresses that need to be translated.

All communication between computer systems on the internal local area network 140 and the global Internet 100 passes through the network address translation device 130. The network address translation device 130 may comprise a suite of firewall applications running on a computer system. Alternatively, the network address translation device 130 may comprise a dedicated hardware network address translation device or a router with network address translation features.

Communication through the network address translation device 130 may originate from a network node (such as workstation 111) on the global Internet to an internal server (such as server 141) on the LAN 140 or from an internal network node (such as workstation 142) to an external server (such as server 121) on the global Internet 100. Each case is, handled in a different manner.

When an internal network node on the LAN 140 that does not have a legal external IP address establishes a connection with a server on the Internet, the network address translation device 130 must perform network address translation since the internal network node does not have a legal IP address. The network address translation 130 translates the internal IP address and internal port number used by the internal network into a legal external Internet IP address and an external port number used by the network address translation device 130.

When a connection is established from a network node on the global Internet to an internal server (such as server 141) on the LAN 140 then the communication is handled into two different ways depending on if the internal server 141 has been assigned a legal external Internet IP address or an internal IP address. If a legal external Internet IP address has been assigned to the internal server 141 then no network address translation is required. However, if an internal IP address has been assigned to internal server 141, then the network address translation device 130 must link an external IP address and external port with the internal server 141 such that the network address translation device 130 can perform network address translation to enable out Internet client to access the internal server 141.

Internet Connections

The vast majority of Internet traffic is carried using a transport protocol layer known as the Transmission Control Protocol (TCP). Transmission Control Protocol (TCP) runs on top of the Internet Protocol network layer protocol. TCP is a connection-oriented protocol that allows virtual connections to be established between two network nodes that use the Internet Protocol network layer. Each TCP connection exists between a defined connection port number (source port) on a source network node having an assigned IP address (source IP address) and a defined connection port number (destination port) on a destination network node having an assigned IP address (destination IP address). Thus, to keep track of TCP connections between internal network nodes and nodes on the global Internet, the network translation device must maintain a list of all the active TCP connections.

The next most often used transport protocol on the Internet is the User Datagram Protocol (UDP). UDP protocol is a connection-less protocol that is used by network applications that do not need the connection overhead of TCP. The remainder of transport protocols used by the Internet are custom transport protocols that make up a very small percentage of the Internet traffic.

A Network Address Translation Device

Figure 2:
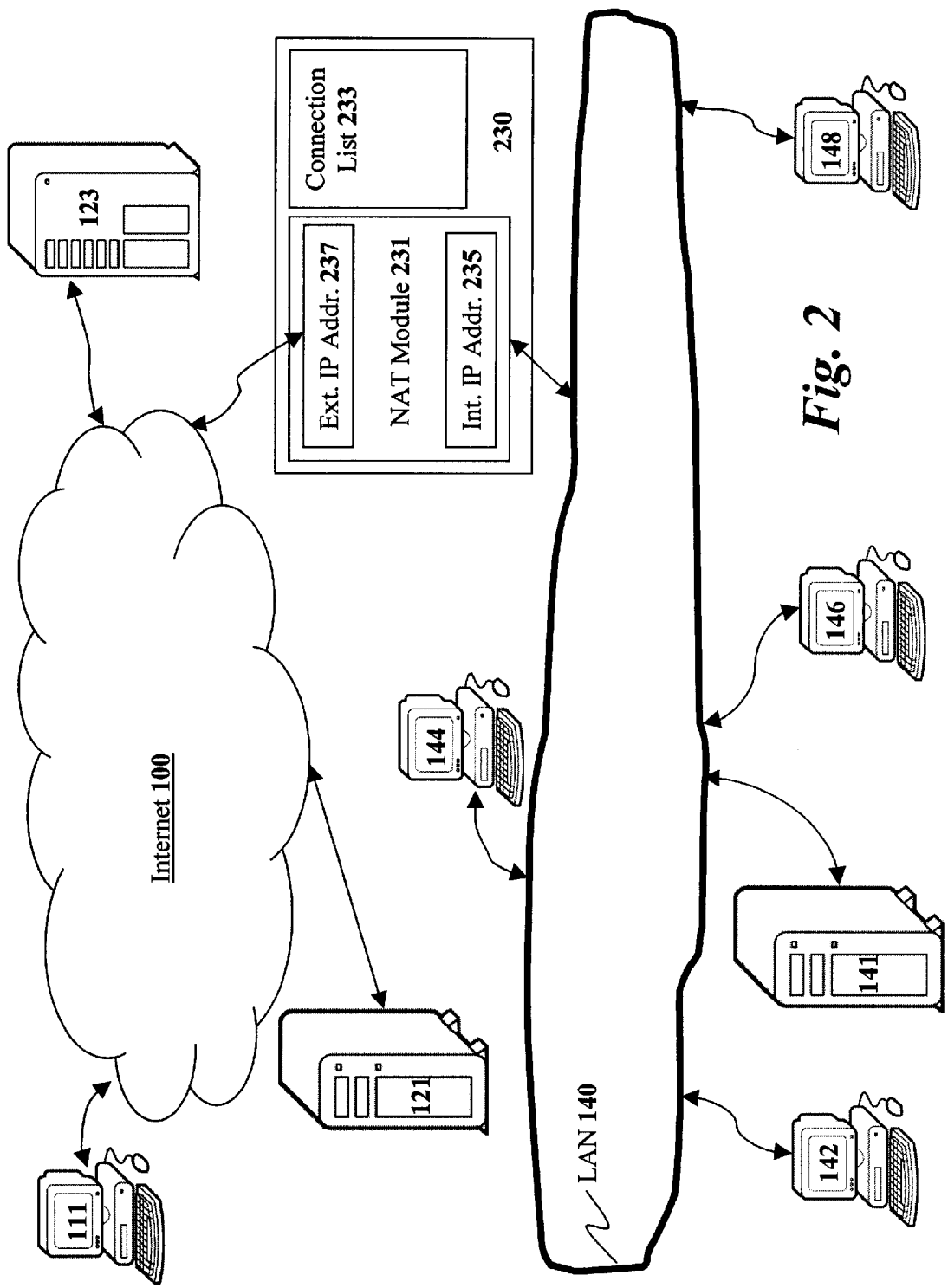
FIG. 2 illustrates the network arrangement of FIG. 1 with additional detail illustrated for the network address translation device.

FIG. 2 illustrates the network arrangement of FIG. 1 wherein some of the internal details of a network address translation device 230 are illustrated in block diagram form. The network address translation device 230 includes a network address translation module 231 for performing network address translation. The network address translation module 231 must be provided with both an internal Internet Protocol address 235 and a legal external Internet Protocol address 237. The network address translation module 231 uses the internal Internet Protocol address 235 when communicating with nodes on the internal local area network 140. The network address translation module 231 uses the external Internet Protocol address 237 when communicating with nodes on the global Internet 100.

To keep track of TCP connections originating from workstations 142, 144, 146, and 148 on the internal local area network 140 and directed toward servers on the global Internet 100 (such as servers 121 and 123), the network address translation module 231 maintains a TCP connection list 233. Each entry in the TCP connection list 233 includes at least the internal source IP address of the internal network device that originated the connection, the internal source port (SP) number, the external IP address used by the network address translation module 231 to build the Internet domain connection, and the port number assigned by the network address translation module 231 to the connection. All responses from the Internet server will be sent to the port number assigned by the network address translation module 231 on the external IP address used by the network address translation module 231.

The network address translation module 231 places a new entry into the connection list 233 when ever an internal workstation or server having an "illegal" internal network IP address initiates a connection with a network node on the global Internet 100. In one embodiment of the present invention, the connection list 233 is organized into a list that may be may be indexed using external connection port numbers assigned to the connections. The connection list may be in a memory or may contain pointers to connection entries in a separate memory unit. To allow multiple network nodes on the internal LAN 140 open multiple TCP connections using a single external IP address 237, the network address translation module 231 uses a different external connection port number for each connection.

When the server on the global Internet 100 responds, that server will send a response packet back to the source port number on the network address translation device 230 with the single external IP address 237. The network address translation module 231 may search the connection list 233 to locate the connection using that particular source connection port number. Alternatively, the network address translation module 231 uses the reverse look-up table to locate the entry in the connection list 233. The network address translation module 231 then translates the external port number and external IP address into the internal port number and internal IP address of the internal network node that opened the connection.

When the internal network sends subsequent packets to the external server that use the same connection that was already established, the network address translation module 231 must find the connection information in the connection list 233. However, since there is no look-up table, the network address translation module 231 must search the network connection list 233 for the connection that the internal network node is using to communicate with. When there are a large number of internal network nodes wherein each network node may establish a large number of individual connections, the network address translation module 231 must spend a large amount time searching for matching connections in the connection list 233. This searching time creates a delay for each connection carried by the network address translation device 230. It would therefore be desirable to reduce the amount of time spent searching for matching connections in the TCP connection list 233 when internal clients continue using the same connections.

High Speed Network Address Translation Method

The present invention takes advantage of certain characteristics in the Internet Protocol addressing system in order to introduce a very efficient high speed Internet network address translation system. Using the teachings of the present invention, a network translation module fetches the appropriate connection from a connection list without any search in most cases.

In a few situations where aliasing has occurred, the network address translation device of the present invention reverts back to a secondary connection search system. In a preferred embodiment, the secondary connection search system organizes connections into a Patricia tree structure. The Patricia tree structure allows the network translation system to quickly and efficiently locate the desired connection. Since the network translation system of the present invention only places connection information in the secondary connection table when there is a collision in the first system, secondary connection table will contain very few entries and therefore will be quickly searched. Thus, even when the present invention uses its fallback search system, the present invention will still be more efficient than convention network address translation connection searches since the amount of information that needs to be searched is greatly reduced.

The Forward Translation System

To rapidly locate the connection entry in a connection list that a particular incoming packet belongs to, the present invention assigns connection port numbers to outgoing connections in a novel manner. In most cases, the connection port numbers wills be used to very quickly index into a list of connections in order to obtain connection information. This method of assigning port numbers is known as "forward translation" (FWT).

The system of the present invention notes that most internal networks are divided into class C subnets that contain less than 255 network nodes. In a class C subnet, only the eight least significant bits of the Internet Protocol address vary between the different hosts. Thus, each network node within a class C network can be uniquely identified using only eight bits.

The present invention takes advantage of this fact by using the eight least significant bits of the Internet Protocol address as a portion of an outgoing connection port number used to establish a connection with a server on the Internet. By using the eight least significant bits of the Internet Protocol address as a portion of an outgoing connection port number, a unique connection port number will likely be generated.

The remaining eight bits of the sixteen bit connection port number are filled with other bits. However, in a preferred embodiment, the remaining eight bits are filled with a control bit and the least significant seven bits are from the connection port number used by the internal network node. The control bit specifies if the forward translation generated port number is used for the connection or another port number was used. The forward translation method of generating connection port numbers creates port numbers that allow for an easy look-up when an internal network node subsequently uses an established connection.

Figure 3A:
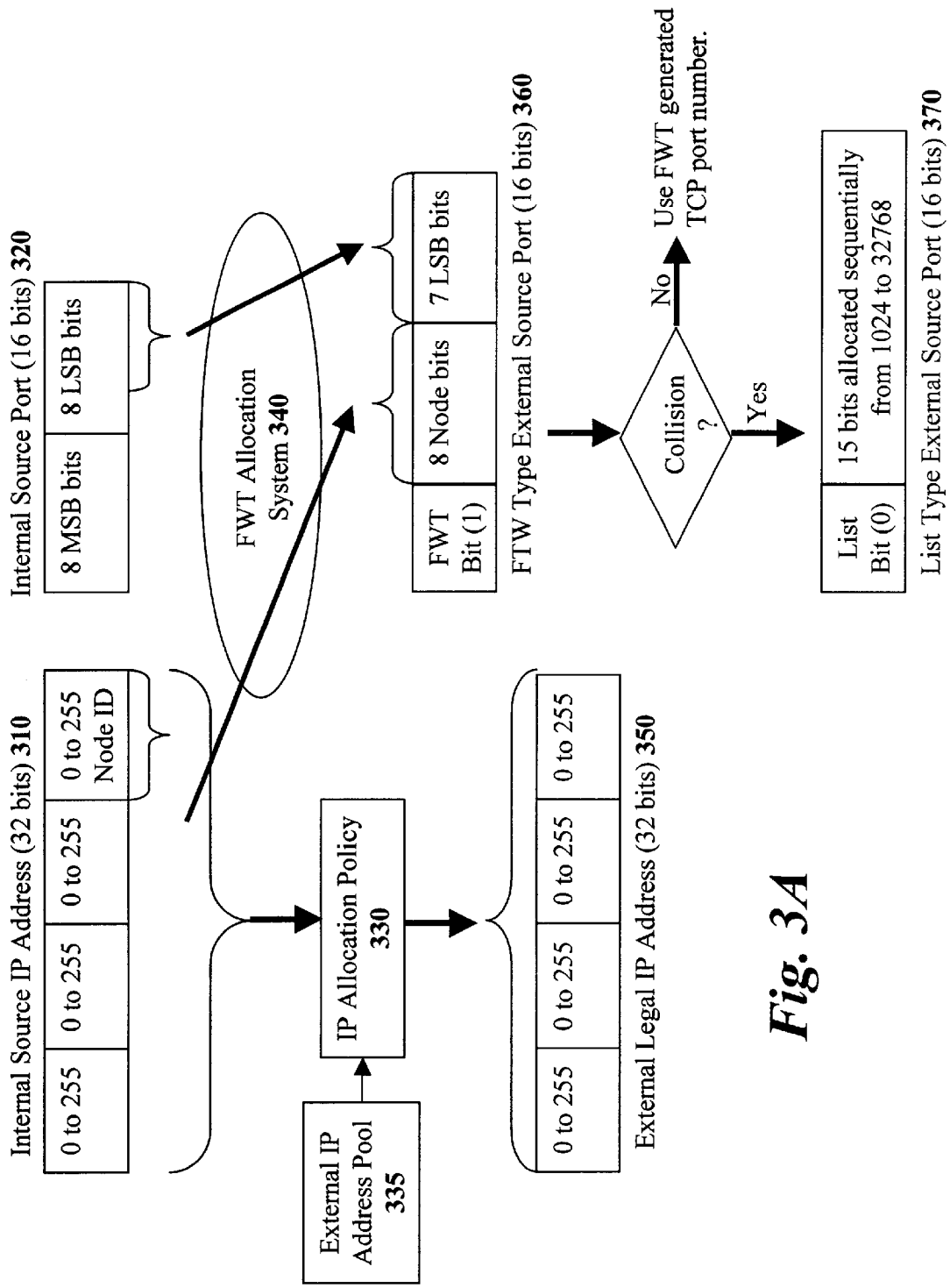
FIG. 3A illustrates how one embodiment of a network address translation device generates statistically unique connection port numbers for outbound connections.

FIG. 3A graphically illustrates how one embodiment of a network address translation device built using the teachings of the present invention generates external IP addresses and port numbers wherein the port numbers are statistically unique. Referring to the top of FIG. 3A, the internal IP address and connection port number of the internal network node initiating an Internet connection is depicted. First, the network address translation device generates a legal external IP address for use with the connection. The legal external IP address is selected from a pool of external IP addresses 335 using an IP Address policy 330.

To generate a connection port number, a forward translation (FWT) allocation policy 340 is used. The forward translation (FWT) allocation policy 340 generates a connection port number by combining three different elements. First, the forward translation (FWT) allocation policy 340 sets the most significant bit to "1" indicating that this is a forward translation generated connection port number. Next, the forward translation (FWT) allocation policy 340 sets the next most eight significant bits equal to the least significant bits of the internal IP address of the internal network node initiating the connection. Finally, the forward translation (FWT) allocation policy 340 sets the least significant seven bits equal to the least significant seven bits of the connection port number used by the internal network node when initiating the connection.

The forward translation generated connection port number will most likely not match any existing connection. One reason for this is that the eight bits in the connection port number from the source network node's internal EP address will only be used for connections initiated by that particular internal network node. Thus, there will be no collisions with connections initiated from other network nodes.

As described above, collisions should only occur from the same internal network node. The least significant seven bits of the forward translation generated connection port number allow each network node to have 127 unique individual connection connections. Provided that the source network node allocates connection port numbers in sequential order, the least significant seven bits from the connection port number allocated by the source network node will be unique until the $128^{th}$ connection is reached.

Most client computer systems such as workstations, personal computers, and network computer devices only have ten to twenty connections at the same time. Thus, most client computers will not generate collisions with themselves.

In some computer networks, client computer systems connect to an internal server and then the internal server opens connections across the Internet. In such networks, there are typically fifty to seventy client systems that may login into a single internal server. In normal usage, only a few client systems will be coupled to the server at the same time. Although each client system may open more than one connection, the total number of outgoing Internet connections rarely exceeds one hundred. Thus, even with a large number of external connections (100) from an internal server, the system of the present invention would still not generate too many duplicated connection port numbers.

The Fall-Back Connection Port Number Allocation System

Although it will occur less frequently, collisions will occasionally occur where the forward translation system of the present invention generates the same connection port number for two different connections. In such a situation, a different connection port number is generated for the second connection. Referring again to FIG. 3A, when a connection port number collision is detected, the present invention uses a fall-back system wherein the most significant bit is set to zero and the remaining fifteen bits of the connection port number are set to a sequential number from 1024 and 32,768 determined by the network address translation device.

In a preferred embodiment, all the connections that are assigned a secondary connection port number are organized into a Patricia tree structure. The Patricia tree structure is a well-known tree data structure for organizing information. The network address translation device organizes the connections in the Patricia tree having sequentially assigned connection port numbers using the internal IP address and port number (a total of 48 bits) used for the connection. In the preferred embodiment, the Patricia tree is implemented as a non-backtracking Patricia tree.

Finding Connection Information

Figure 3B:
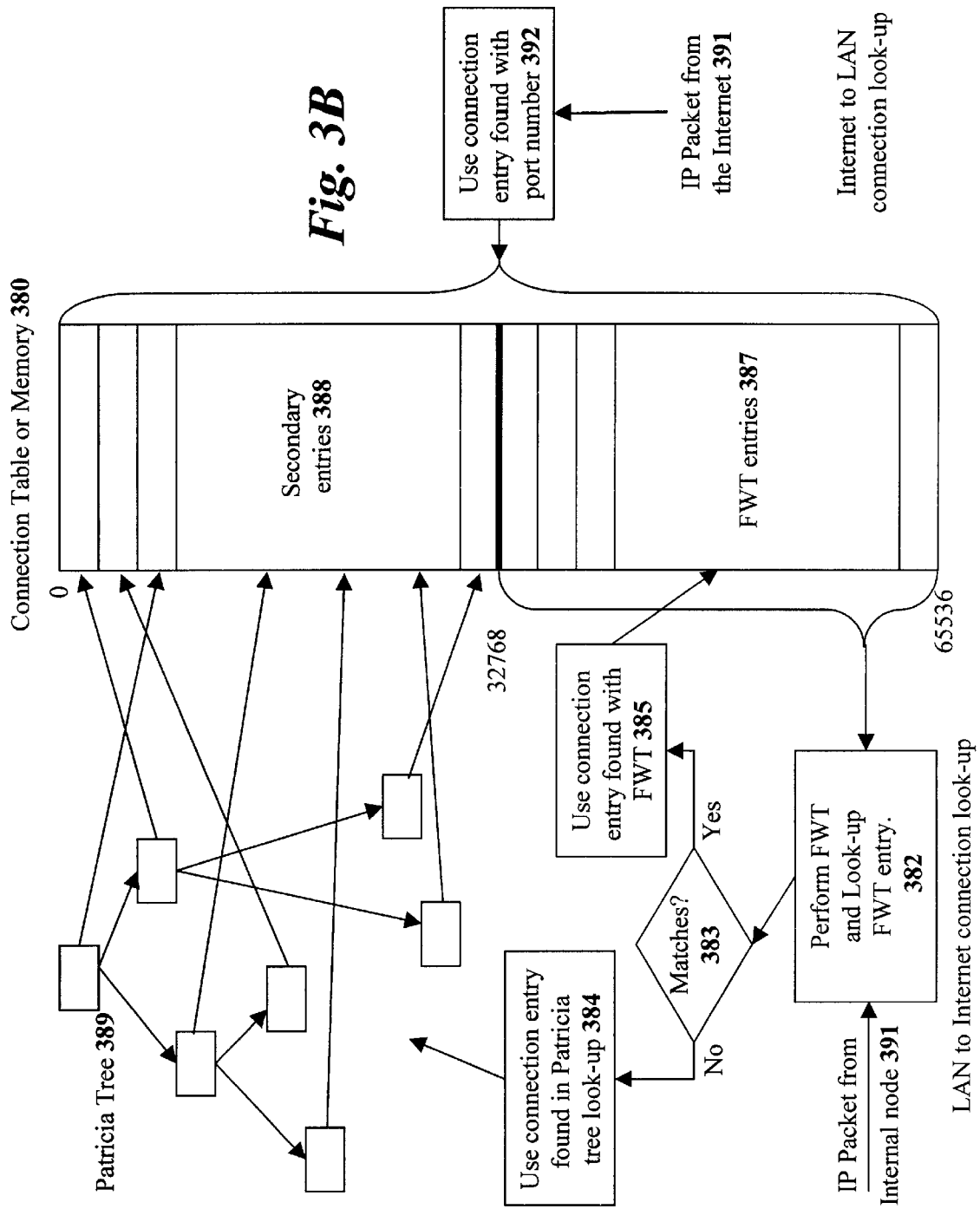
FIG. 3B illustrates how the statistically unique port numbers is used to index into a table of connections.

FIG. 3B conceptually illustrates how a network translation device constructed according to the teachings of the present invention associates incoming packets with existing connections. The right-hand portion of FIG. 3B describes how Internet to LAN packets are associated with existing connection information and the left-hand portion of FIG. 3B describes how LAN to Internet packets are associated with existing connection information.

A connection table or connection memory 380 that stores a list of connections is illustrated in the center of FIG. 3B. As previously set forth, the connection list may be a full table in a memory (connection memory) or a table of pointers (connection table) that point to connection entries in another memory unit. Using the embodiment of FIG. 3A, the control bit in the most significant bit of the port number specifies if that if the connection is a "forward translation" (FWT) entry 387 (MSB set) or a secondary connection table entry 388 (MSB clear).

Referring to the right-hand portion of FIG. 3B, incoming packets 391 from the Internet are associated with a connection entry using the port number in the packet as an index. This is known as a "reverse look-up".

Referring to the left-hand portion of FIG. 3B, a small flow diagram describes how incoming packets 381 from internal LAN nodes are associated with a connection entry. When the network address translation device receives an internal network node packet 381, the network address translation device performs forward translation to generate an index into the connection table at step 382. The connection entry information is compared with the packet at step 383. If the packet is associated with the connection entry, then that connection information is used as stated in step 385. If the connection, entry does not match, the network address translation device searches the secondary connection entries. In one embodiment, the network address translation device searches a Patricia tree 389 used to store connection entries for connection entries given a sequential connection port number as stated in step 384. The network address translation device searches the Patricia tree 389 using the internal IP address and internal port number as a key. If the network address translation device locates a matching connection entry using the Patricia tree 389, then the network address translation device will use the connection information from that entry.

Operation of a Network Address Translation Device

To fully describe one possible implementation of a network address translation device that uses forward translation, this section provides detailed functional information on the operation of a network address translation device that uses forward translation. This section will refer to FIGS. 4, 5, 6, 7 and 9 that graphically illustrate the steps performed by the network address translation device when the network address translation device receives a packet.

Handling Packets

Figure 4:
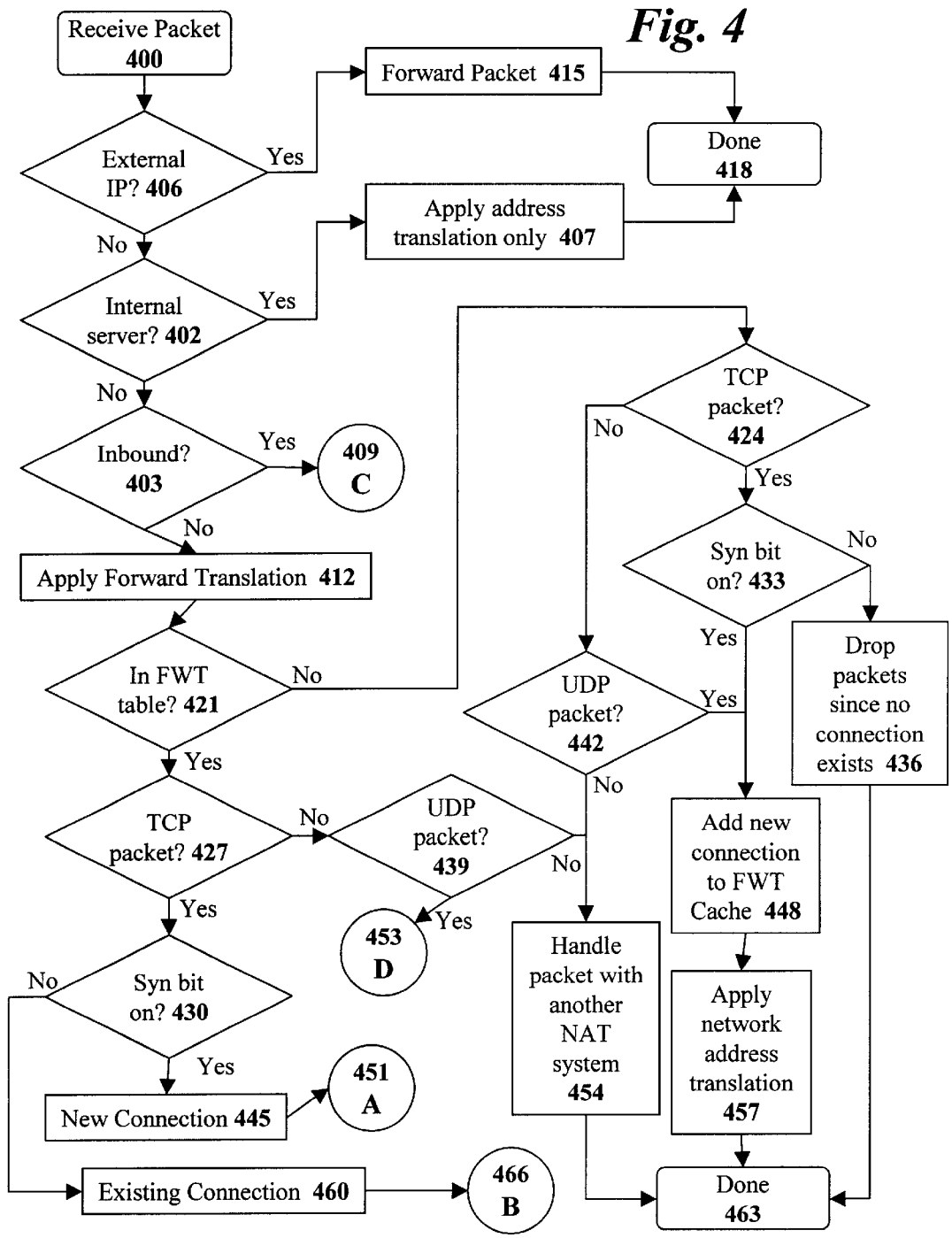
FIG. 4 illustrates how the network address translation device of the present invention processes received packets.

Referring to step 400 of FIG. 4, a packet has been received by a network address translation device. At step 406, the network address translation device determines if the packet is addressed to one of legal external IP addresses or coming from one of the legal external IP addresses on the LAN. For such packets, then the network address translation device simply forwards the packet along as stated in step 415. Thus, the network address translation device simply acts as a router in such a situation.

Next, at step 402, the network address translation device determines if the packet is addressed to a configured service offered by an internal server on the LAN or comes from an internal server on the LAN. If so, then network address translation only is applied as stated in step 407.

Figure 7:
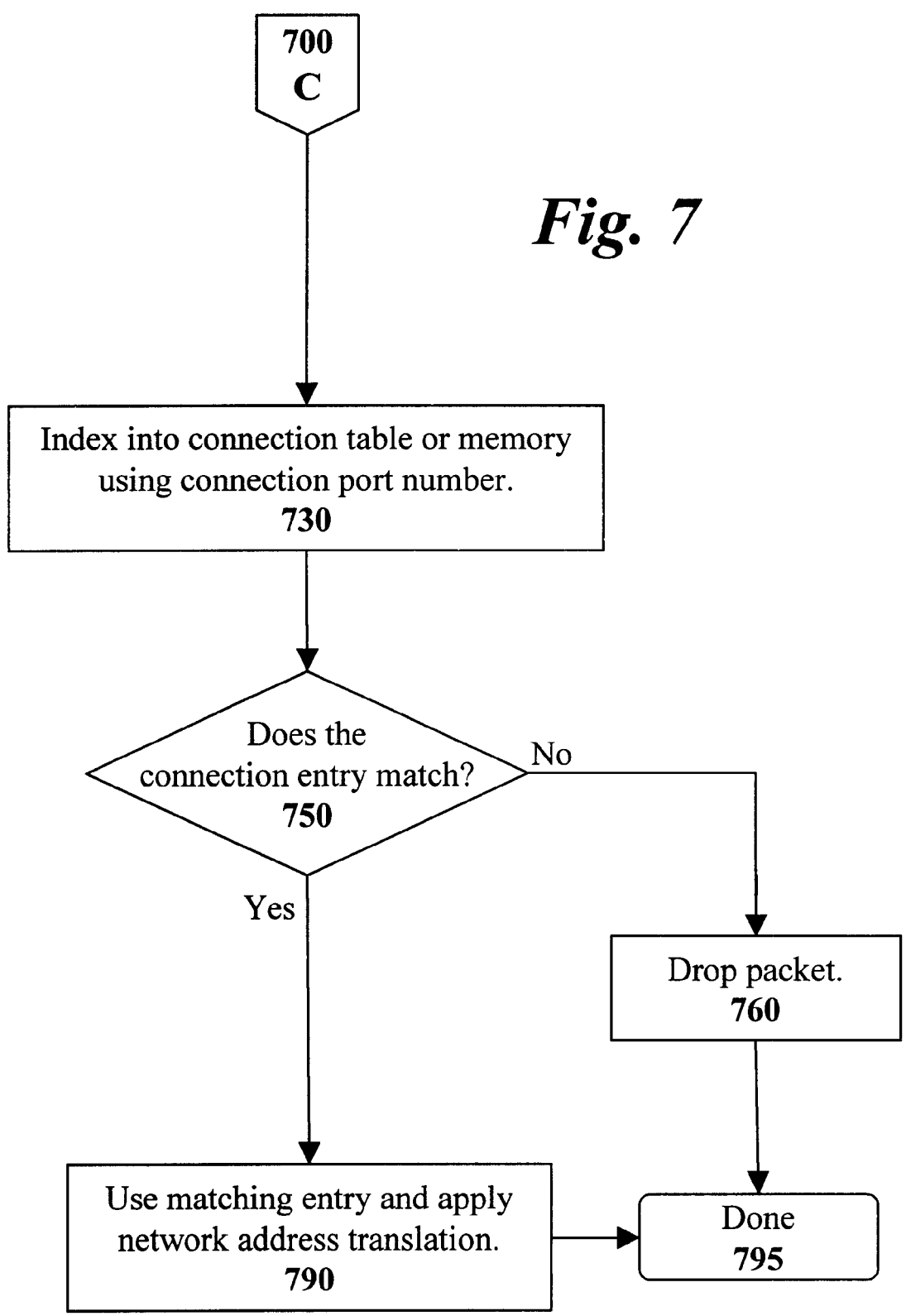
FIG. 7 illustrates a flow diagram setting forth the steps for handling inbound packets.

Next, at step 403, the network address translation device examines the packet to determine if the packet is inbound (from the Internet to the LAN) or outbound (from the LAN to the Internet). If the packet is inbound (from the Internet) then the network address translation device proceeds to step 409. For such inbound packets, a reverse look-up is performed. The reverse look-up comprises indexing into the set of forward translation organized cache using the connection port number. FIG. 7 illustrates the reverse look-up method.

Referring to FIG. 7, the reverse took-up first proceeds to step 730 where the destination port number is used to index into the connection table or connection memory. At step 750, the network address translation device compares the packet information with the connection entry information. If the packet does not match the existing connection, then the packet is discarded at step 760. If the packet is associated with located connection entry, then the network address translation device uses the connection entry land performs network address translation at step 790.

Handling Outbound Packets

Referring back to FIG. 4, if the packet is outbound (from LAN to Internet), the network address translation device proceeds to step 412 where a forward translation is performed to generate a possible connection port number. At step 421, the network address translation device determines if a matching FWT entry already exists at that connection port number.

When No Forward Translation Entry Exists

If a FWT entry does not exist, the network address translation device proceeds to step 424 where it determines if the packet is a TCP packet. If the packet is a TCP packet, then the network address translation device proceeds to step 433 where the SYN bit of the packet is examined. The SYN bit is set when a new TCP connection is being established. If the SYN bit is not set, then the network address translation device proceeds to step 436 where the packet is discarded since the packet claims to be from an existing connection yet no connection information for such a connection was found.

Referring back to step 433, if the SYN bit was set, then a new connection is being created. At step 448, the network address translation device creates a new entry in the FWT cache using the generated connection port number. The network address translation device then performs network address translation on the packet at step 457 and sends the translated packet out onto the Internet.

Referring back to step 424, if the packet is not a TCP packet then the network address translation device proceeds to step 442 where the network address translation device determines if the packet is a UDP (User Datagram Protocol) packet. UDP packets are, similar to TCP packets except that much of the formal connection. establishment handshaking steps are eliminated. If the packet is a UDP packet, the network address translation device proceeds to create a new FWT cache entry at step 448, perform network address translation on the packet at step 457, and send the address translated UDP packet out onto the Internet.

If the packet is not a TCP or a UDP packet, then some other another connection system, is used at step 454. Non TCP and UDP Packets are handled at step 454 using either only IP address only translation if sufficient or a translation system based on the Internal IP address as well as other information as contained in the packet that is required to identify a unique connection.

A network address translation system based on the Internal IP address and other information as contained in the packet must examine the contents of each packet to perform the translation. This packet content based translation information may be stored in the secondary connection list or in a third connection list. For example, packet content based network address translation may be performed on ICMP packets by having the internal network node identify its packets using the client's internal IP address, an identifier, and a sequence number. ICMP Error packets from the WAN are handled via the standard implementation wherein the network address translation port information is extracted from the ICMP data fields and then reverse translated back to the internal network node.

In practice, the percentage of non TCP/UDP packets is very small. Thus, non TCP/UDP connections may be stored into a non TCP/UDP connection information table that is searched using a Patricia tree or a linear search structure.

When a Forward Translation Entry Does Exist

Referring back to step 421, when a FWT entry does exist for the generated connection port number, the network address translation device proceeds to step 427 where it determines if the packet is a TCP packet. If the packet is a TCP packet, then the network address translation device proceeds to step 430 where the SYN bit of the packet is examined. As previously set forth, the SYN bit in a TCP packet is set when a new TCP connection is being established. If the SYN bit is not set, then the packet is from an existing TCP connection as stated in step 460. The steps for handling a TCP packet from an existing connection are set forth in FIG. 6 and will be described later.

Referring back to step 430, if the SYN bit is set, then packet indicates a new TCP connection is being established as stated in step 445. The network address translation device thus proceeds to create a new TCP connection entry in a situation where a matching FWT entry already exists. The steps for creating a new connection entry in a situation where a matching FWT entry already exists are set forth in FIG. 5. Similarly, if the network address translation device determines that the packet is a UDP packet at step 439, the network address translation device thus proceeds to step 453 to handle UDP packets. If the packet is not a TCP or a UDP packet, then another network address translation system is used at step 454.

Establishing a New Connection Entry When a Forward Translation Entry Does Exist

Figure 5:
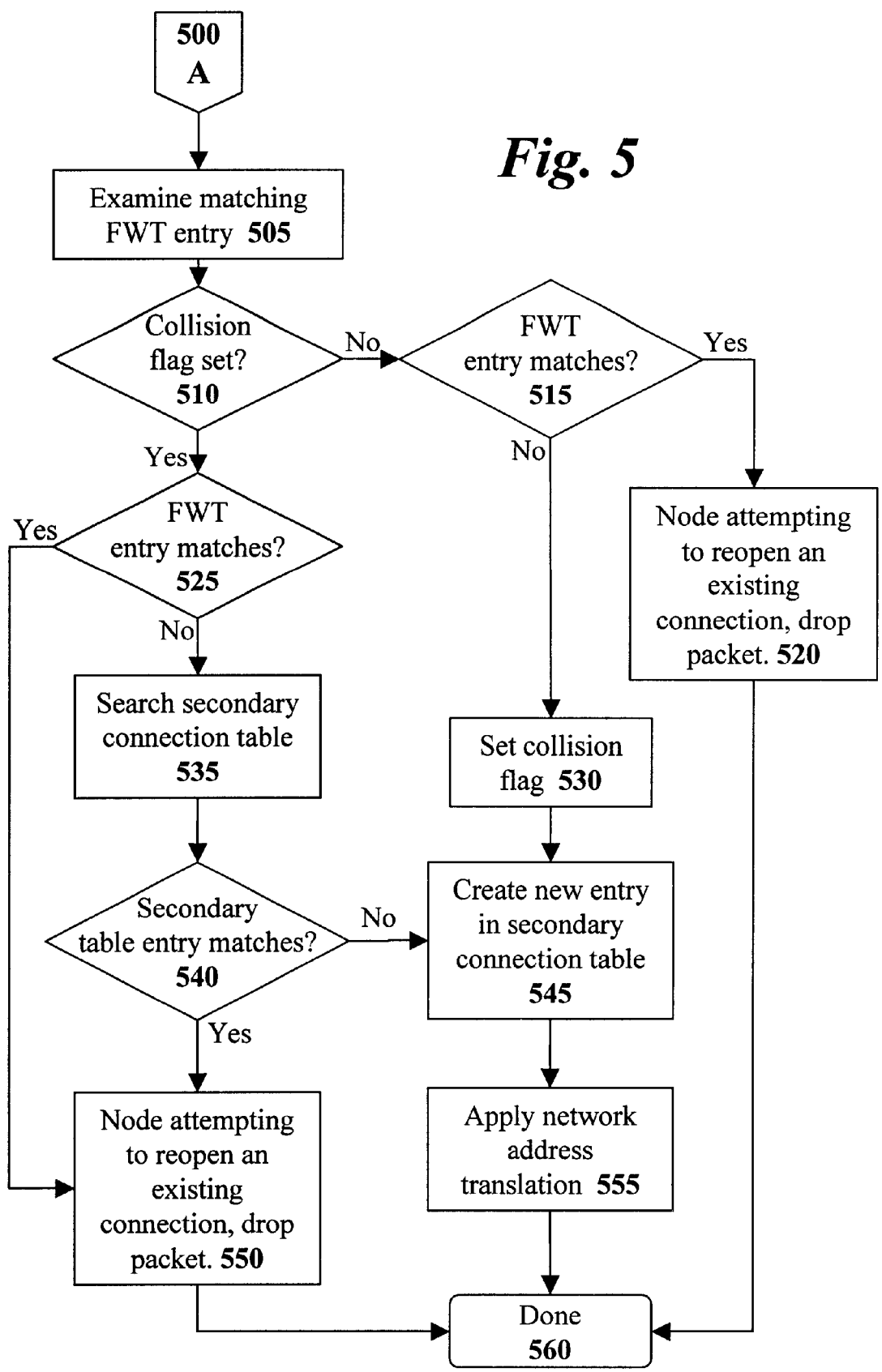
FIG. 5 illustrates a flow diagram setting forth the steps for creating a new connection entry when a matching FWT entry already exists.

FIG. 5 illustrates how the network address translation device thus proceeds to establish a new connection by creating a new connection entry in a situation where a FWT entry with a matching FWT generated connection port number already exists. Referring to step 505, the network address translation device examines the matching FWT entry. At step 510, the network address translation device determines if the collision flag is set for the matching FWT entry.

If the collision flag is not set, then only the single FWT connection entry exists. The network address translation device compares the packet to the existing FWT connection entry at step 515 to determine if the packet belongs to that connection. If the packet seems to match that existing FWT entry, then the internal network node is attempting to create a new connection to the same destination IP address and same port of the already existing connection as stated in step 520. Such a packet should not be generated by the network node and is therefore dropped. If the existing FWT connection entry does not match at step 515, the network address translation device creates a new entry in the secondary connection table. This is performed by setting the collision flag entry in the FWT table entry at step 530 and then creating a new entry in the secondary connection table using a sequentially generated connection port number as stated in step 545. The network address translation device then performs network address translation on the packet and. forwards the translated packet onto the Internet in step 555.

Referring back to step 510, if the collision flag is set then there are more than more than one entry use the same FWT generated connection port number. This situation may occur with greater probability when an internal network node opens more than one hundred and twenty-seven simultaneous TCP connections. In such a situation, the network address translation device first compares the packet to the existing FWT connection entry at step 525 to determine if the packet belongs to that connection. If the packet seems to match that existing FWT entry, then the internal network node is attempting to create a new connection to the same destination IP address and same port of the already existing connection as stated in step 550. Such a packet should not be generated by the network node and is therefore dropped at step 550.

If the existing FWT connection entry does not match at step 525, the network address translation device examines the secondary connection table at step 535. If a matching connection entry is found in the secondary cache at step 540, then the network address translation device discards the packet at step 550 since the internal network node is attempting to recreate an existing connection. Otherwise, the network translation device, creates a new connection entry. This is performed by creating a new entry in the secondary connection table using a sequentially generated connection port number as stated in step 545. The network address translation device then performs network address translation on the packet and forwards the translated packet onto the Internet in step 555.

Finding an Existing Connection Entry for Outbound Packets

Figure 6:
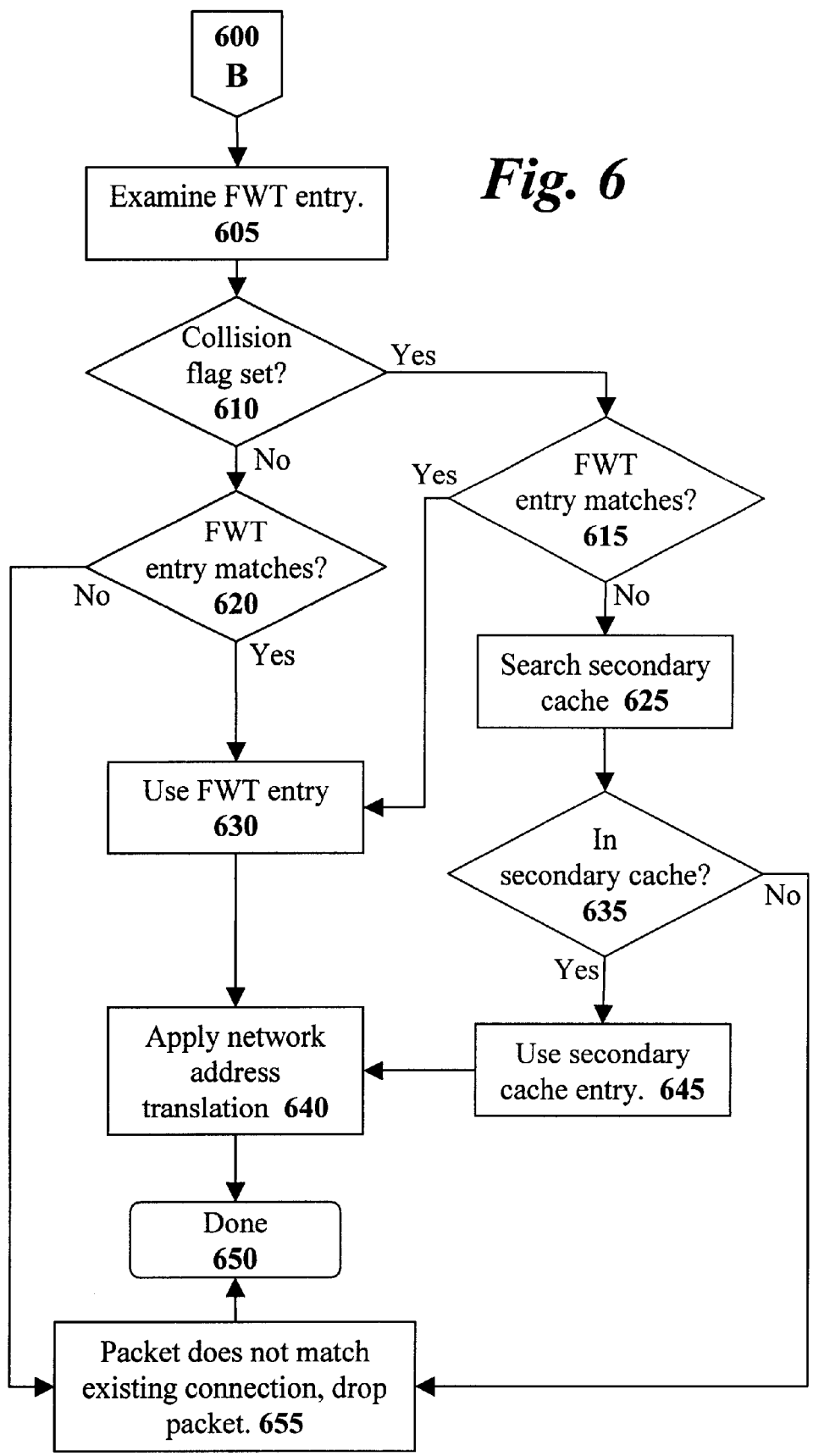
FIG. 6 illustrates a flow diagram setting forth the steps for handling a TCP packet associated with an existing connection.

Referring back to step 460 in FIG. 4, when an outbound TCP packet for an existing connection is detected, the network address translation device searches for an existing connection entry. FIG. 6 explains how the network address translation device handles outbound packets for existing TCP connections.

Referring to step 605, the network address translation device first examines the appropriate FWT entry. At step 610, the network address translation device determines if the collision flag for the FWT entry is set. If the collision flag is not set, then only the single FWT connection can match the packet. At step 620, the network address translation device verifies that the packet belongs to the connection described in the FWT entry. If the packet does not match the existing FWT entry, then the packet does not belong to any known connection. In such a situation, the network address translation device drops the placket as set forth in step 655. However, if the FWT entry matches at step 620, then the network address translation device uses the FWT entry as set forth in step 630. The network address translation device uses the connection information from the matching FWT entry to perform network address translation as set forth in step 640.

Referring back to step 610, if the collision flag is set then there is more than one possible connection entry. The network address translation device first tests the FWT connection entry at step 615 to determine if the FWT entry matches the packet. If the FWT entry matches, the network address translation device uses the FWT connection entry to perform network address translation as set forth in steps 630 and 640. If the FWT connection entry does not match, then the network address translation device searches the secondary connection cache at step 625. If a matching connection entry is found in the secondary connection cache at step 625, then the network address translation device uses the secondary connection entry to perform network address translation as set forth in steps 645 and 640. If no matching connection entry is found, then the network address translation device drops the packet as set forth in step 655 since the packet claims to be from a connection that does not exist.

Handling UDP Packets

Figure 9:
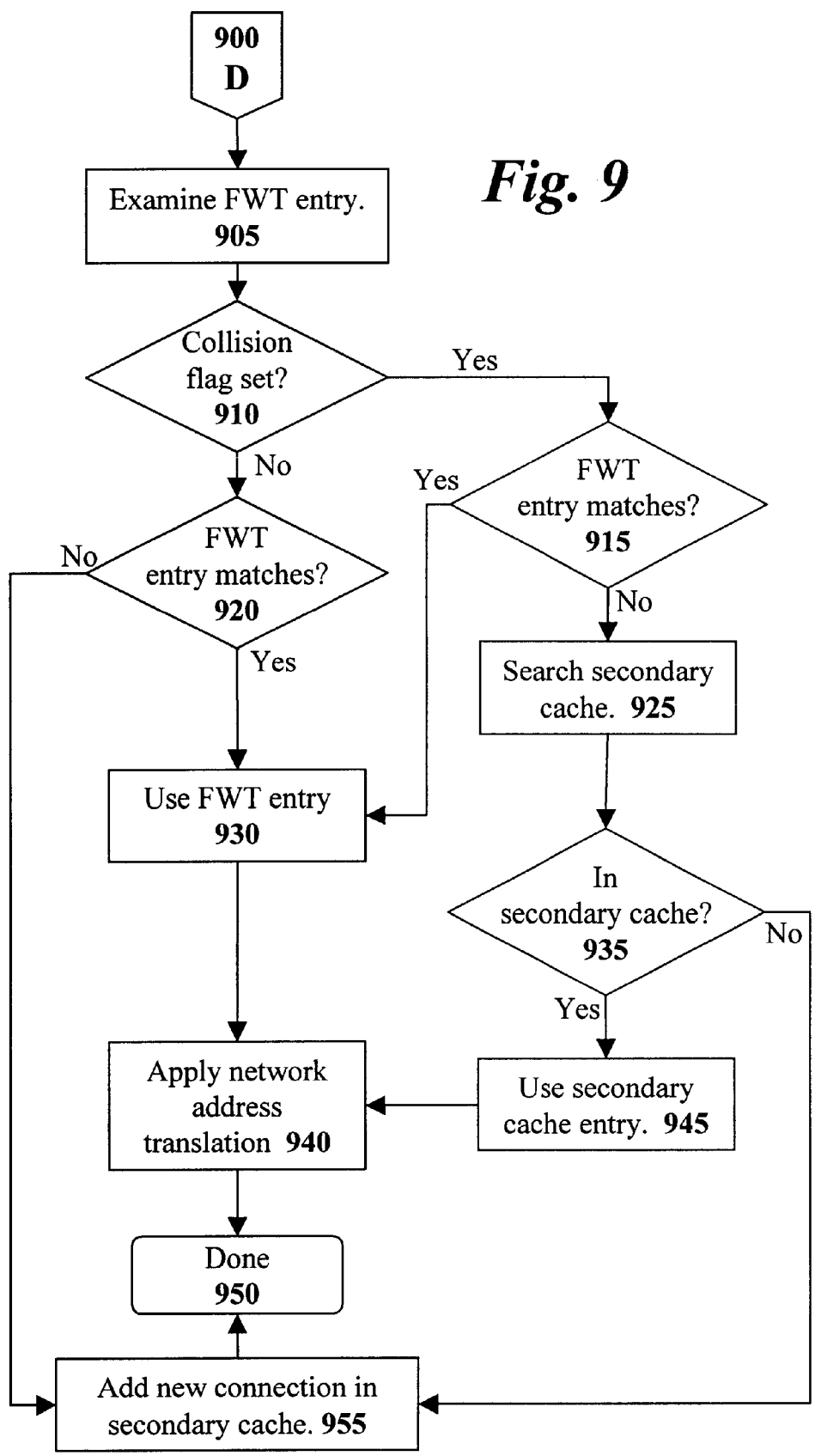
FIG. 9 illustrates a flow diagram setting forth the steps for handling a UDP packet.

Referring back to step 453 in FIG. 4, when UDP packet is detected, the network address translation device proceeds to FIG. 9 that describes how UDP packets are handled. The UDP packet handling of FIG. 9 is the same as the TCP packet handling of FIG. 6 except that UDP packets do not signal when a new connection is created. Therefore, if the UDP packet doesn't match an existing connection, then a new connection is created and added to the connection list as stated in step 955. UDP connections are removed from the connection list after a configurable amount of time if no traffic exists on that connection. In one implementation, UDP connections are removed after one minute of idle time.

Using More Than One Legal External IP Address

Since the present invention uses the node identifier of a class C IP address (the least significant eight bits) to uniquely identify outbound connections, the present invention will function best with class C networks have less than 255 network nodes. If a class B network is used, collisions may occur between individual network nodes due to network nodes having the same bit pattern in the eight least significant bits of their IP addresses. To prevent such collisions, the present invention is designed to use a pool of IP addresses such that no more than 255 network nodes share the same external IP address.

Referring back to FIG. 3A, the external IP address of the outgoing connection is selected using IP allocation policy 330 that access a pool of IP addresses 335. In one embodiment, the IP allocation policy 330 selects the same external IP address for all internal network nodes that have the same most significant 24 bits in their IP address. Thus, all the network nodes that will be assigned to the same external IP address will have unique bit patterns in the least significant eight bits of their internal IP addresses. Thus, by ensuring that there is a unique external IP address for every 255 hosts there will be no FWT collisions between different network nodes.

The WP allocation policy 330 may allocate external IP addresses in just about any manner selected by the network administrator. For example, the external IP addresses may be allocated based upon information known about the internal network nodes. For example, the internal network nodes may be divided into different groups such as engineering, marketing, and sales. Each group may receive a different external IP address that is associated with the particular group such that Internet usage by the various groups can be tracked.

A Hardware Embodiment

Figure 8:
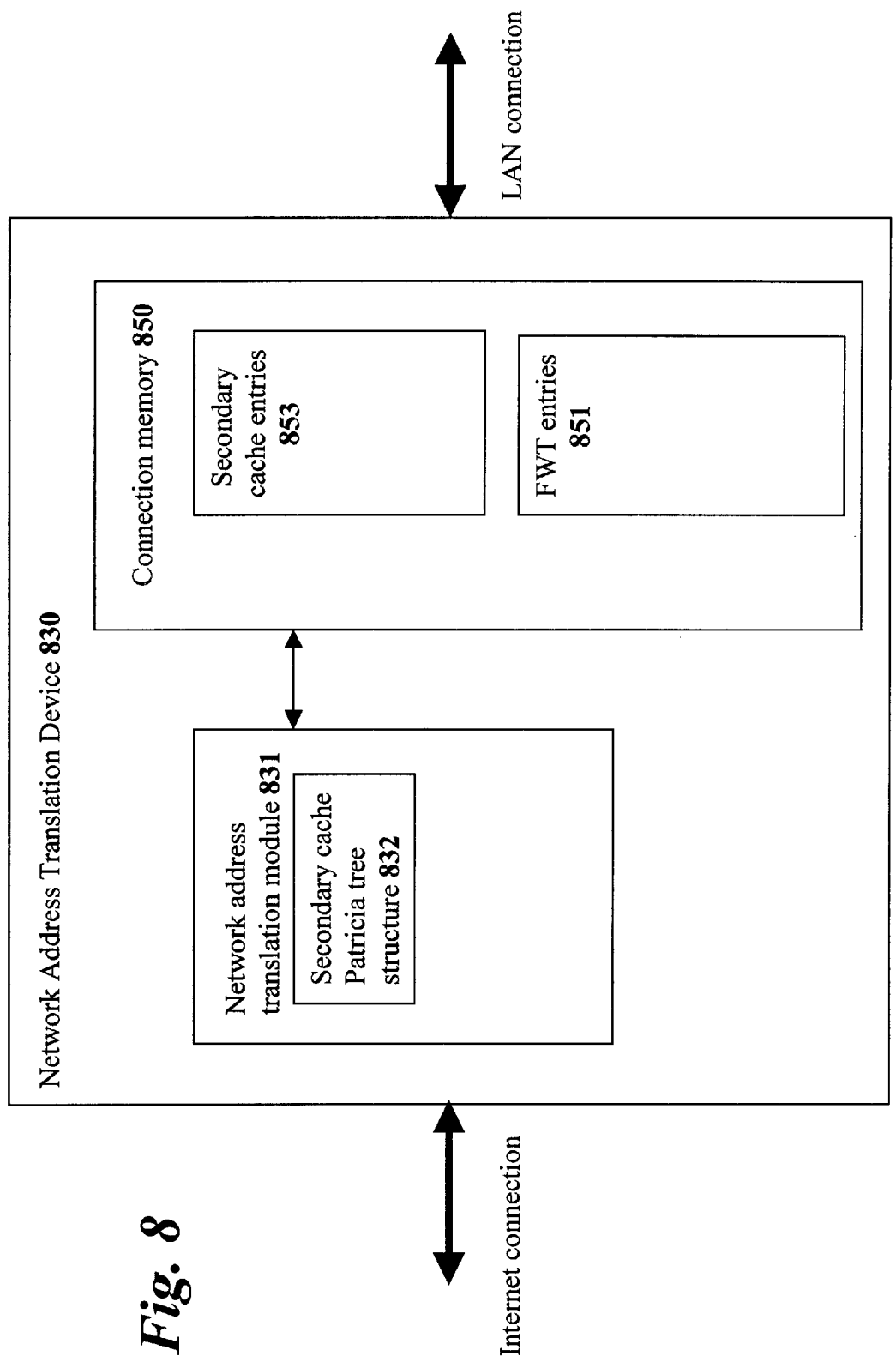
FIG. 8 illustrates a block diagram of one particular network address translation device embodiment that uses forward translation.

To implement the network address translation device of the present invention with high performance, a hardware implementation is suggested. FIG. 8 illustrates one possible hardware embodiment.

FIG. 8 illustrates a network address translation Device 830 having an Internet connection and a local area network connection. The network address translation device 830 may comprise a full Internet firewall device with a number of individual modules (not shown). At a minimum, the network address translation device 830 performs network address translation.

In the network address translation device 830 of FIG. 8, the actually network address translation is performed by network address translation module 831. The network address translation module 831 examines all incoming and outgoing packets as set forth in the previous sections in order to perform network address translation. To store information about the connections maintained by the network address translation device 830, the network address translation module 831 uses a connection memory 850. The connection memory 850 may comprise static RAM (SRAM) or any other suitable memory type. The connection memory 850 includes both the forward translation entries 851 and the secondary cache entries 853.

When the network address translation module 831 needs to access an FWT entry in the connection memory 850 the network address translation module 831 first generates a connection port number using the FWT method. Then, the network address translation module 831 creates an index into the forward translation entries 851 by scaling the FWT generated TCP number using a size of the FWT entries and adding a base address value. The index is used to immediately access the desired FWT entry.

When the network address translation module 831 needs to access a particular entry in the secondary cache entries 853, the procedure is not quite so simple. First the network address translation module 831 must traverse the Patricia tree used to organize the secondary cache. To improve the performance of the Patricia tree traversal, the network address translation module 831 keeps the Patricia tree structure 832 in a high-speed cache memory within the network address translation module 831 itself. The Patricia tree structure 832 includes a memory pointer at each leaf node. The memory pointer points to the actual connection entry within the secondary cache entries 853 of the connection memory 850. By keeping the Patricia tree structure 832 in a high-speed cache memory, the connection entries in the secondary connection cache can be located very quickly.

To further improve the speed of traversal of the Patricia tree structure 832, the network address translation module 831 examines four bits of the forty-eight bit Patricia tree key at the same time. By testing four bits simultaneous, the Patricia tree will be traversed in a maximum of twelve iterations.

The foregoing has described a method and apparatus for performing Internet network address translation. It is contemplated that changes and modifications may be made by one of ordinary skill in the art, to the materials and arrangements of elements of the present invention without departing from the scope of the invention.

We claim:

1. A method of performing network address translation, said method comprising:

generating a statistically unique port number for a network connection initiated by a network node, said statistically unique port number comprising a first subset of bits that correspond to an address assigned to said network node and a second subset of bits from a second port number assigned by said network node; and storing information about said network connection in a connection entry in a connection table indexed by said statistically unique port number.

2. The method as claimed in claim 1, said method further comprising:

generating a secondary unique port number if said statistically unique port number collides with an existing used port number.

3. The method as claimed in claim 2 wherein said secondary unique port number is generated using a sequential number.

4. The method as claimed in claim 2 wherein said secondary unique port number is placed in a secondary connection table.

5. The method as claimed in claim 4 wherein said secondary connection table is organized using a Patricia tree.

6. The method as claimed in claim 1 wherein said first subset of bits that correspond to said address assigned to said network node comprise a set of least significant bits from said address assigned to said network node.

7. The method as claimed in claim 6 wherein said first subset of bits that correspond to said address assigned to said network node comprise a subset of bits from an IP address assigned to said network node.

8. The method as claimed in claim 1 wherein each entry in said connection table comprises a collision bit that indicates if said generating a statistically unique port number generated matching port numbers for at least two different connections.

9. The method as claimed in claim 1 wherein each entry in said connection table comprises an internal node address, an internal port number, an external node address, and an external port number.

10. An apparatus for performing network address translation, said apparatus comprising:

a first network port, said first network port for connecting said apparatus to a first computer network;

a second network port, said second network port for connecting said apparatus to a second computer network;

a first connection table, said first connection table for maintaining information about a first set of connections;

a forward translation module for generating a statistically unique port number for a first network connection initiated by a first network node on said first computer network to a second network node on said second computer network, said statistically unique port number comprising a first subset of bits that correspond to an address assigned to said first network node and a second subset of bits from a second port number assigned by said network node; and a network address translation module, said network address translation module storing information about said first network connection in said first connection table indexed by said statistically unique port number.

11. The apparatus as claimed in claim 10 wherein said network translation module generates a secondary unique port number if said statistically unique port number collides with an existing used port number.

12. The apparatus as claimed in claim 11 wherein said secondary unique port number is generated using a sequential number.

13. The apparatus as claimed in claim 11 further comprising:

a second connection table, said second connection table for maintaining information about a first set of connections;

wherein said secondary unique port number is placed in said second connection table.

14. The apparatus as claimed in claim 13 wherein said second connection table is organized using a Patricia tree.

15. The apparatus as claimed in claim 10 wherein said first subset of bits that correspond to said address assigned to said first network node comprise a set of least significant bits from said address assigned to said first network node.

16. The apparatus as claimed in claim 15 wherein said first subset of bits, that correspond to said address assigned to said first network node comprises an eight least significant bits from an IP address assigned to said first network node.

17. The apparatus as claimed in claim 10 wherein an entry in said first connection table comprises a collision bit that indicates if said forward translation module generated matching port numbers for at least two connections.

18. The apparatus as claimed in claim 10 wherein each entry in said first connection table comprises an internal node address, an internal port number, an external node address, and an external port number.

19. A method of performing network address translation, said method comprising:

generating a statistically unique port number for a network connection initiated by a network node;

storing information about said network connection in a connection table indexed by said statistically unique port number if said statistically unique port number is absolutely unique;

generating an absolutely unique port number for said network connection initiated by said network node if said statistically unique port number is not absolutely unique; and storing information about said network connection in a secondary connection table if said statistically unique port number is not absolutely unique.

20. The method as claimed in claim 19 wherein said secondary connection table is organized using a Patricia tree structure.

21. The method as claimed in claim 19 wherein said statistically unique port number comprises a first subset of bits that correspond to an address assigned to said network node.

22. The method as claimed in claim 21 wherein said first subset of bits that correspond to said address assigned to said network node comprise a set of least significant bits from said address assigned to said network node.

23. The method as claimed in claim 19 wherein said statistically unique port number comprises a first subset of bits from an Internet Protocol address assigned to said network node.

24. The method as claimed in claim 19 wherein said statistically unique port number comprises a first subset of bits from a port number assigned by said network node.

25. The method as claimed in claim 19 wherein said absolutely unique port number is generated using a sequential number.

26. The method as claimed in claim 19 wherein an entry in said connection table comprises an internal node address, an internal port number, an external node address, and an external port number.

27. The method as claimed in claim 26 wherein an entry in said connection table further comprises a protocol type.

* * * * *